United States Patent Office 3,053,094
Patented Sept. 11, 1962

3,053,094
INSTRUMENTS
David R. Maugle, Quakertown, Pa., assignor to Ametek, Inc., a corporation of Delaware
Filed Apr. 21, 1958, Ser. No. 729,969
2 Claims. (Cl. 73—431)

This invention relates to instruments, and particularly to a small measuring instrument subject to varying operating conditions.

The invention is particularly useful for small measuring instruments, such as pressure gauges, which are subject to wide temperature variations causing stresses and strains in the materials used in the construction of the instruments and also movement of certain elements relative to other elements where the elements are formed of parts having different thermal coefficients of expansion. In measuring instruments of this type it is desirable to have the interior of the instrument isolated from the ambient atmosphere. However, where the instrument is small and the temperature variation is high, relative movement of the parts is magnified and it is difficult to achieve this isolation.

One of the objects of this invention, therefore, is to provide a small instrument in which the interior of the instrument is isolated from the ambient atmosphere regardless of the variation in operating conditions.

Another object of this invention is to provide an instrument in which the casing and the instrument carrying portion are free to move relative to each other in a radial direction while maintaining a seal in the space therebetween.

A further object of this invention is to provide an instrument in which the casing and the instrument carrying portion are free to move relative to each other in a radial direction, but in which relative movement therebetween in a longitudinal direction and in a circumferential direction is prevented.

It is a further object of this invention to provide an instrument having a flexible annular sealing member to permit relative radial movement between the casing and the instrument carrying portion, a clip member for preventing relative longitudinal movement between these parts, and interlocking means for preventing relative circumferential movement therebetween.

The foregoing and other objects, features and advantages hereof will become apparent from the following description and drawings which are merely exemplary.

In the drawings:

FIG. 1 is a side elevational view, with parts broken away, of an instrument embodying the principles of the invention;

FIG. 2 is a front elevational view of the instrument of FIG. 1;

FIG. 3 is a perspective view of the clip member for securing the casing and the instrument carrying portion;

FIG. 4 is a perspective view of the casing;

FIG. 5 is a perspective view of the instrument of FIG. 1 prior to the positioning of the instrument carrying portion in the casing; and FIG. 6 is an enlarged cross-sectional view of the connection between the base portion and the casing.

As can best be seen in FIGS. 1 and 4, the illustrated instrument includes a casing 10 which is cylindrical in shape and has an inwardly directed annular flange 11 at its front end and an outwardly directed annular flange 12 at its rear end.

A disc 13 of transparent material, such as glass or plastic, having a diameter approximating the interior diameter of casing 10 is mounted in the forward end of casing 10 and bears against flange 11. Flange 11 is shown as having a rearwardly directed lip 14 so as to minimize the area thereof which contacts the front face of disc 13. Also mounted within casing 10 is an annular locking member 15 having an outer diameter about the same as that of the interior diameter of casing 10 so that locking member 15 is securely held in place by the frictional engagement between the interior surface of casing 10 and the exterior surface of locking member 15. In order to hold disc 13 against lip 14, locking member 15 has an inwardly directed flange portion 16 which bears against the interior surface of disc 13. In the form shown in the drawings, a solid face portion 17 engages the lower half of the interior surface of disc 13. This face portion may, for example, have printing thereon to indicate the type of instrument. Of course, if the entire area of disc 13 is needed for indicating purposes, then face portion 17 may be omitted.

A measuring instrument of the type shown also includes a disc or dial 18 within casing 10 and behind disc 13. Dial 18 has suitable indicating indicia thereon to cooperate with a pointer 19 to indicate the condition being measured.

The instrument carrying or operating portion of the instrument, shown generally as 20, includes a threaded nipple 21 having a bore therein (not shown) through which the fluid under pressure passes to operate pointer 19 in a manner well known in the art. Portion 20 includes a base portion 22, formed integrally with nipple 21, which has the other operating parts of the instrument secured thereto.

Base portion 22 has a diameter approximating the interior diameter of casing 10 and a flange 23 extending radially outwardly from the outer surface thereof so that, when the base portion 22 is inserted in casing 10, the front surface of flange 23 will contact the rear surface of flange 12 on casing 10. An annular groove 24 is formed in the outer peripheral surface of base portion 22 immediately to the front of flange 23. Located within this groove is a flexible O-ring 24A of rubber or the like, which is dimensioned so that it extends radially beyond the outer surface of base portion 22 when in an uncompressed position. When the base portion 22 is inserted in casing 10, O-ring 24A is compressed against the inner surface of casing 10 to seal off the interior of the casing from the ambient atmosphere. The diameter of O-ring 24A is such that it will provide this sealing action regardless of the degree of radial separation between the outer peripheral surface of base portion 22 and the inner surface of casing 10. Variations in such radial separation result in a small measuring instrument of the type illustrated when the instrument is subjected to high variations in pressure, due in some cases to stresses and strains in the casing or the base portion, and due in some cases to the fact that the casing and base portion are formed of materials having different thermal coefficients of expansion.

In order to prevent relative longitudinal movement between base portion 22 and casing 10, an annular clip member 25 is provided. Clip member 25 has an annular inwardly directed flange 26 at its forward end, the rear surface of which engages the front surface of flange 12 on casing 10. Legs 27 on the rear edge of clip member 25 bend around flange 23 on base portion 22 so as to lie against inclined surface 28 of a cutout portion 29 in the rear surface of base portion 22. Thus, the clip member 25 firmly secures casing 10 and base portion 22 against relative longitudinal movement without preventing relative radial separation therebetween. (Such separation is shown in FIG. 6.) If desired, the particular construction of the locking portions of clip member 25 may be varied, such as, by substituting an annular flange portion which may be bent against inclined surface 28 for legs 27, by substituting suitable tongues for flange 26, or in many other ways which could be devised by those skilled in the art.

In order to prevent relative circumferential movement between base portion 22 and casing 10, a locking arrangement is provided which includes tongues 30 extending rearwardly from casing 10 which engage cutout portions 31 formed in flange 23 of base portion 22. Other suitable locking arrangements may be provided for preventing such relative circumferential movement.

It is to be understood that the described exemplary embodiment is merely intended for the purpose of illustration, and that the principles of the invention are not intended to be limited thereto, except as defined in the appended claims.

What is claimed is:

1. An instrument housing comprising a cylindrical hollow casing having an inwardly directed annular flange at its front end and an outwardly directed annular flange at its rear end, a transparent disc within said casing and against the rear surface of said inwardly directed flange, an annular locking member tightly engaging the inner surface of said casing, said locking member having an inwardly extending flange which engages said disc to securely hold said disc against the inwardly directed flange on the casing, an instrument carrying member within said casing having a base portion adjacent the rear end of said casing, an annular cutout portion in the rear surface of said base portion spaced radially inwardly of the outer edge of said base portion, the outer surface of said cutout portion being sloped inwardly from rear to front, an annular clip member overlying said outwardly directed flange on said casing, said clip member having an inwardly directed flange which engages said outwardly directed flange on said casing, said clip member having means which extend inwardly and engage the sloped surface of said cutout portion, said clip member preventing relative longitudinal movement between said base portion and said casing while permitting relative radial displacement therebetween, an annular groove in the outer peripheral surface of said base portion, and annular flexible sealing means within said annular groove which extends radially outwardly to engage the inner surface of said casing regardless of the radial displacement between said casing and said base portion.

2. An instrument housing comprising a cylindrical hollow casing having an outwardly directed annular flange at its rear end, an instrument carrying member within said casing having a base portion adjacent the rear end of said casing, said base portion having an outwardly directed flange with a forward surface thereof in abutment with the rear surface of said flange on said casing, cut-out portion means in the rear surface of said base portion spaced radially inwardly of the outer edge of said base portion, the outer surface of said cut-out portion means being sloped inwardly from rear to front, an annular clip member overlying said outwardly directed flange on said casing, said clip member having an inwardly directed flange which engages the forward surface of said outwardly directed flange on said casing, said clip member having means which extend inwardly and engage the sloped surface of said cut-out portion means, said clip member preventing relative longitudinal movement between said base portion and said casing while permitting relative radial displacement therebetween, an annular groove in the outer peripheral surface of said base portion and an annular flexible sealing means within said annular groove which extends radially outwardly to engage the inner surface of said casing regardless of the radial displacement between said casing and said base portion.

References Cited in the file of this patent

UNITED STATES PATENTS

| | | |
|---|---|---|
| 1,733,600 | Heman | Oct. 29, 1929 |
| 1,734,236 | Smith et al. | Nov. 5, 1929 |
| 1,761,953 | Zubaty | June 3, 1930 |
| 2,005,792 | Leins | June 25, 1935 |
| 2,123,532 | Hastings et al. | July 12, 1938 |
| 2,558,743 | Ford | July 3, 1951 |
| 2,647,235 | Hogenbirk | July 28, 1953 |